United States Patent [19]

Hepworth et al.

[11] 4,070,630
[45] Jan. 24, 1978

[54] DATA TRANSFER SYNCHRONIZING CIRCUIT

[75] Inventors: Edward Clare Hepworth, Austin, Tex.; Rodney Jerome Means, Tempe, Ariz.

[73] Assignee: Motorola Inc., Schaumburg, Ill.

[21] Appl. No.: 682,822

[22] Filed: May 3, 1976

[51] Int. Cl.² .......................... H03K 1/17; H03K 5/13
[52] U.S. Cl. .................................. 328/63; 307/221 R; 307/269; 328/37
[58] Field of Search ............... 328/37, 63; 307/221 R, 307/269, 208

[56] References Cited

U.S. PATENT DOCUMENTS

| 3,510,576 | 5/1970 | Centanni | 328/37 |
| 3,781,821 | 12/1973 | Roth | 328/37 |
| 3,916,323 | 10/1975 | Moriyama et al. | 328/37 |
| 3,972,034 | 7/1976 | Derickson et al. | 328/37 |
| 3,980,820 | 9/1976 | Niemi et al. | 328/63 |

*Primary Examiner*—Stanley D. Miller, Jr.
*Attorney, Agent, or Firm*—Anthony J. Sarli, Jr.

[57] ABSTRACT

A digital logic circuit synchronizing data transfers between asynchronously clocked data systems. Synchronization is accomplished by three logically interlocked storage elements which respectively record and control (1) the time when data is available for transfer, (2) time when data transfer begins and (3) the time when data transfer is complete. Transfer is accomplished without a loss of data independent of the clock pulse width and frequency relationship of the asynchronously clocked systems.

10 Claims, 2 Drawing Figures

DATA TRANSFER SYNCHRONIZING CIRCUIT

RELATED APPLICATIONS

This application is related to assignees' copending U.S. patent application Ser. No. 540,752 "EDGE SENSITIVE SET RESET FLIP-FLOP" by Hepworth et al filed on Jan. 13, 1975, now U.S. Pat. No. 3,976,949.

BACKGROUND OF THE INVENTION

The majority of modern day data systems are synchronous data systems in the sense that the internal operation of the digital logic forming systems is paced or controlled by a "clock". The clock is a source of timing pulses, usually of fixed frequency, from which the other digital signals required to correctly control the system can be derived. The frequency of the clock is typically determined from the frequency of an oscillator internal to the system. The frequency and digital pulse width characteristics of the clock used in a given system vary widely depending upon the system requirement to be fulfilled. In systems in which the speed of operations is dependent upon this speed of a human interface, for example, a manually operated keyboard, or in systems where other physical limitations affect speed such as the frequency limitations imposed by transmitting audio information over a telephone line, a very low speed clock may be desirable. In other systems, such as microprocessor systems, where it is desirable to perform a large number of program execution cycles and memory cycles during the time interval between two events, a high frequency clock is required. Thus, a common situation is to have a set of digital subsystems having high and low frequency internal clocks which are timed asynchronously with respect to each other all operating within the same system environment. A problem arises when it is required that data be transferred between such subsystems. The problem is that digital information may be mutilated or lost if the time of data transfer prescribed by the clock of one system happens to occur during a transition of a clock of the other data system in such a way that a logic element defining digital information to be transferred is in a logically indeterminate state.

SUMMARY OF THE INVENTION

Accordingly, it is an object of this invention to provide a digital logic circuit which synchronizes the transfer of digital information between two data systems whose internal system clocks are timed asynchronous with respect to each other.

It is a further object of this invention to provide a digital logic system for synchronizing the transfer of digital information between two data systems whose internal clocks are time asynchronous with respect to each other and whose internal clocks may have widely differing frequency, phase and pulse width characteristics.

Briefly described, the present invention is a digital logic circuit which synchronizes data transfers between asynchronously clocked data systems through the use of three logically interlocked storage elements which function interdependently to record and control the time when data is available for transfer, the time when data transfer begins, and the time when data transfer is complete such that transfer is accomplished without a loss of data independent of the clock pulse width and frequency relationshiop of asynchronously clocked data systems.

DETAILED DESCRIPTION

Figure 1:
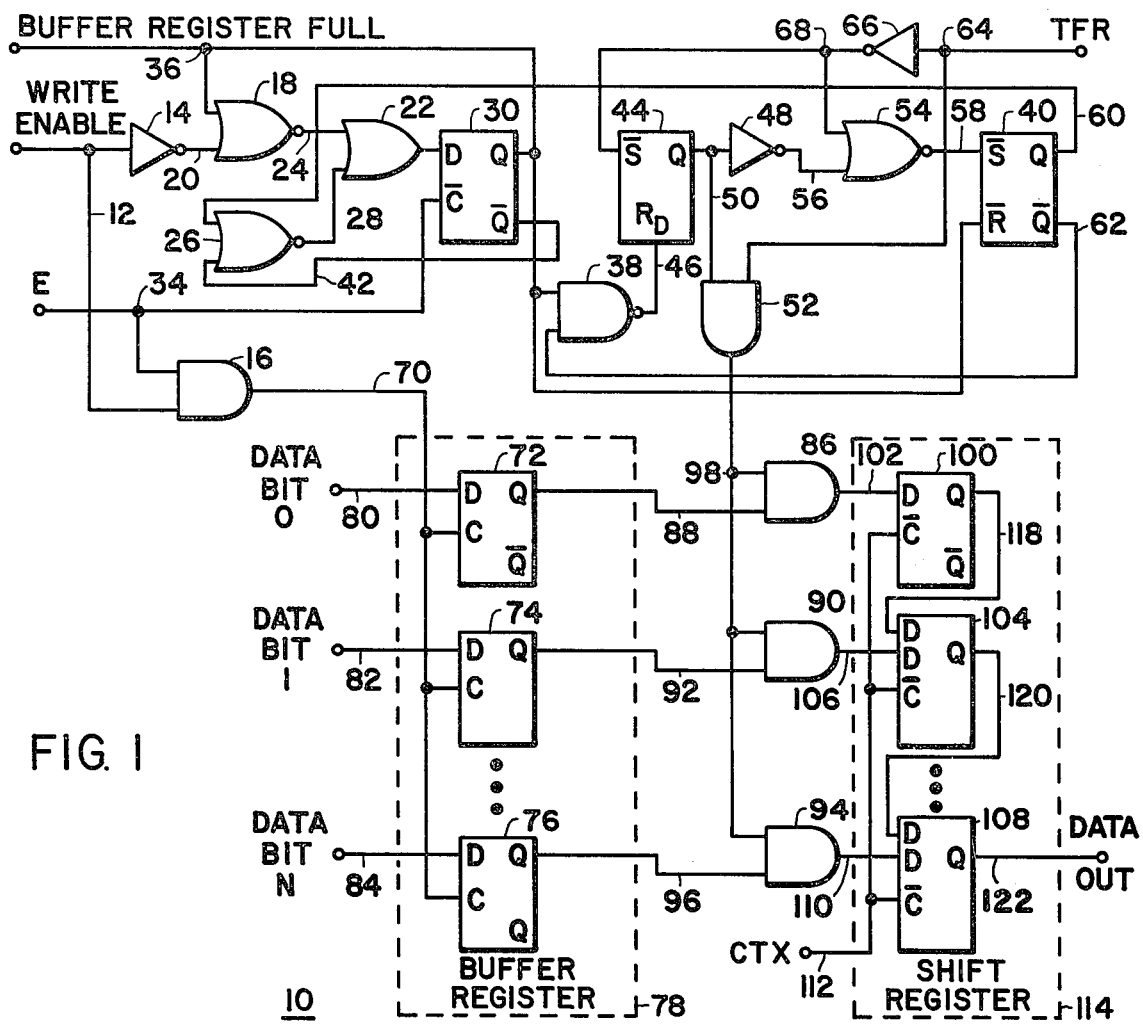
FIG. 1 is a logic diagram of the data transfer synchronizing circuit of the present invention.

FIG. 1 shows a particular embodiment of a data transfer synchronizing circuit 10 according to the present invention. Conductor 12 which is the write enable input to circuit 10 couples to the input of inverter 14 and also couples to one input of AND gate 16. The output of inverter 14 couples to an input of two input NOR gate 18 via conductor 20. The output of NOR gate 18 couples to an input of OR gate 22 via conductor 24, a second input of OR gate 22 couples to the output of NOR gate 26 via conductor 28. The output of OR gate 22 couples to the D input of flip-flop 30 via conductor 32. Conductor 34, which is the E clock input to circuit 10 couples to an input of AND gate 16 and to the $\overline{C}$ input of flip-flop 30. The Q output of flip-flop 30 couples to conductor 36 which is the buffer register full output of circuit 10. Conductor 36 also couples to an input of NOR gate 18, an input of NAND gate 38 and to the $\overline{R}$ input of flip-flop 40. The $\overline{Q}$ output of flip-flop 30 couples to an input of NOR gate 26 via conductor 42. The output of NAND gate 38 couples to the direct reset input of flip-flop 44 via conductor 46. The Q output of flip-flop 44 couples to the input of inverter 48 via conductor 50 which also couples to an input of AND gate 52. The output of inverter 48 couples an input of NOR gate 54 via conductor 56. The output of NOR gate 54 couples to the $\overline{S}$ input of flip-flop 40 via conductor 58. The Q output of flip-flop 40 couples to an input of NOR gate 26 via conductor 60. The $\overline{Q}$ output of flip-flop 40 couples to an input of NAND gate 38 via conductor 62. Conductor 64, which is the data transfer (TFR) input to circuit 10 couples to the input of inverter 66 and to an input of AND gate 52. The output of inverter 66 couples to an input of NOR gate 54 and the $\overline{S}$ input of flip-flop 44 via conductor 68. Conductor 70 couples from the output of AND gate 16 to the clock inputs of flip-flop 72, 74 and 76 which form buffer register 78. Input data bit zero couples to the D input of buffer register flip-flop 72 via conductor 80. Input data bit 1 couples to the D input of buffer register flip-flop 74 via conductor 82. The input data bit N couples to the D input of buffer register flip-flop 76 via conductor 84. The Q output of buffer register flip-flop 72 couples to an input of AND gate 86 via conductor 88. The Q output of buffer register flip-flop 74 couples to an input of AND gate 90 via conductor 92. The Q output of buffer register flip-flop 76 couples to an input of AND gate 94 via conductor 96. The output of AND gate 52 couples to an input of AND gate 86, 90 and 94 via conductor 98. The output of AND gate 86 couples to the D input of shift register flip-flop 100 via conductor 102. The output of AND gate 90 couples to a D input of shift register flip-flop 104 via conductor 106. The output of AND gate 94 couples to a D input of shift register flip-flop 108 via conductor 110. Conductor 112 which is the transmitter clock (CTX) input to circuit 10 couples to the $\overline{C}$ input of shift register flip-flop 100, 104 and 108 which form shift register 114. The Q output of shift register flip-flop 100 couples to a D input of shift register flip-flop 104 via conductor 118. The Q output of shift register flip-flop 104 couples to a D input of shift register flip-flop 108 via conductor 120. The Q output of shift register flip-flop 108 couples to conductor 122 which is the data output terminal of data transfer synchronizing circuit 10.

Figure 2:
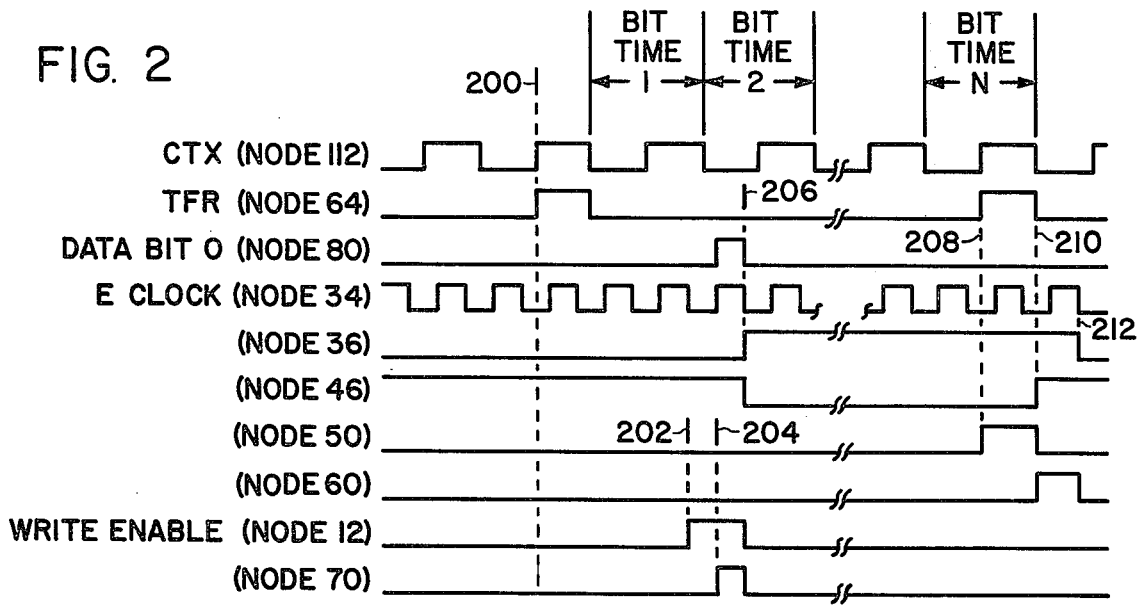
FIG. 2 is a timing diagram useful in explaining the operation of the digital logic circuit of FIG. 1.

The mode of operation of the data transfer circuit of the present invention is explained by considering the logic diagram shown in FIG. 1 in conjunction with the timing diagram shown in FIG. 2. The logic circuitry shown in FIG. 1 illustrates a portion of the interface between two clocked data systems. A data word of N bits originating in the first data system is parallel loaded into buffer register 78 via data bit conductors 80, 82 and 84. Parallel loading is accomplished by a logic 1 on conductor 70 which couples in common to the clock inputs of buffer register flip-flops 72, 74 and 76. Logic 1 on write enable conductor 12 and on clock conductor 34 are combined by AND gate 16 to produce logic 1 on conductor 70. Shift register 114 is a transmitting shift register which serially transmits data via data output conductor 122 under control of the transmitting clock CTX on conductor 112. Shift register flip-flops 100, 104 and 108 are negative edge clocked delay flip-flops which are interconnected to form a shift register. Data can be loaded into flip-flops 104 and 108 at either of the two D inputs as a logical "OR" function. Each successive logic 1 to logic 0 transition on clock conductor CTX (node 112) causes data to be shifted by one bit in the flip-flops of shift register circuit 114 to produce the next bit time of serial output data on conductor 122. The timing diagram of FIG. 2 illustrates N successive bit times as defined by the logic 1 to logic 0 transitions of the CTX clock. Control logic in the second data system (not shown) determines when the serial transmission of one data word of N bits is complete and generates a logic 1 level transfer pulse on conductor 64 during the last half of the Nth bit time. The logic one pulse on the transfer input controls the parallel loading of the next data word of N bits from buffer register circuit 78 to shift register circuit 114. The logic 1 transfer pulse on conductor 64 is coupled to one input of AND gate 52. If the other input of AND gate 52 is also logic 1, a logic 1 pulse will be produced at the output of AND gate 52 which couples via conductor 98 to the inputs of AND gates 86, 90 and 94 thereby gating the logic levels present on buffer register output conductors 88, 92 and 96 to produce appropriate logic levels on conductors 102, 106 and 110 which couple to data inputs of shift register flip-flops 100, 104 and 108 respectively.

The basic requirement for data transfer circuit 10 is that data be transferred from buffer register circuit 78 to shift register circuit 114 without the loss or mutilation of data. A potential problem associated with this data transfer is that the timing signal or clock E on conductor 34 is not in time synchronism with signal TFR on conductor 64. The logic circuit of the present invention which prevents such loss or mutilation of data comprises buffer register full flip-flop 30, data transfer initiate flip-flop 44 and data transfer complete flip-flop 40 together with the logic gates and conductors by which they are logically interconnected. Flip-flop 30 is a negative edge clocked delay flip-flop so that whatever logic level is present at the D input (node 32) at the time of a logic 1 to logic 0 transition on the $\bar{C}$ input (node 34) is stored in the flip-flop and appears at the Q output (node 36). Flip-flop 44 is a negative edge triggered set-reset flip-flop. A logic 1 to logic 0 transition on the $\bar{S}$ input (node 68) sets this flip-flop such that the Q output (node 50) becomes logic 1. A logic 1 on the reset direct input (node 46) jams flip-flop 44 in the reset state such that the Q output (node 50) is held at logic 0. Flip-flop 40 is also a negative edge triggered set-reset flip-flop. A logic 1 to logic 0 transition on the $\bar{S}$ input (node 58) sets flip-flop 40 such that its Q output (node 60) is at a logic 1 state and its $\bar{Q}$ output (node 62) is at a logic 0 state. A logic 1 to logic 0 transition on the $\bar{R}$ input (node 36) resets flip-flop 40 such that its $\bar{Q}$ output (node 62) is at a logic 1 state and its Q output (node 60) is at a logic 0 state. Additional information on negative edge triggered set-reset flip-flops of the type exemplified by flip-flop 44 and flip-flop 40 is provided in assignee's copending patent application Ser. No. 540,752 previously mentioned.

The logic circuitry of the present invention provides a sequential circuit which transfers data transfer control from a first clock system (the E clock, node 34) to a second clock system (TFR, node 64 derived from clock CTX, node 112) to allow data transfer to occur. Control is then returned back to the first clock system when data transfer is complete. The data transfer sequence is initiated when buffer register full flip-flop 30 is set indicating that a word of data is present in buffer register 78 and is available for transfer. When buffer register full flip-flop 30 is set, the occurrence of a logic 1 pulse on the transfer input TFR initiates the sequence which transfers control to the CTX clock system. When the buffer register full flip-flop 30 is reset, a logic 1 pulse on the transfer input can not initiate the sequence as is illustrated at time 200 in FIG. 2. Since buffer register full flip-flop 30 is reset, node 36, which couples to the input of NAND gate 38 is at logic 0. This results in logic 1 at the output of NAND gate 38 which is coupled to the reset direct input of the initiate data transfer flip-flop 44 via conductor 46, jamming flip-flop 44 in the reset state so that node 50 is held at logic 0. This logic 0 at node 50 blocks AND gate 52 so that the logic 1 pulse on the transfer input which is coupled to an input of AND gate 52 via conductor 64 can not cause a change in the output of AND gate 52.

When buffer full register flip-flop 30 is in the reset state, the resulting logic 0 on buffer register full conductor 36 indicates to the first data system (not shown) that the buffer register 78 is available for the parallel loading of another data word. This loading is initiated by the first data system (not shown) which produces a logic 1 pulse on write enable input conductor 12 as is shown at time 202 in the timing diagram of FIG. 2. This results in a logic 1 pulse at node 70 when the E clock (node 34) goes to a logic 1 at time 204 resulting in the parallel loading of a data word at the buffer register 78 as described above. The logic 1 pulse on write enable input 12 is inverted by inverter 14 to produce logic 0 on conductor 20 which couples to an input of NOR gate 18. The other input of NOR gate 18 is coupled to conductor 36 which is also at logic 0 resulting in logic 1 on conductor 24 which couples to an input of OR gate 22. This results in logic 1 on conductor 32 which couples to the data input of buffer register full flip-flop 30 so that the flip-flop is set by the occurrence of a logic 1 to logic 0 transition on E clock conductor 34 at time 206 causing node 36 to change from a logic 0 level to a logic 1 level as shown in FIG. 2. Correspondingly, the complementary output of flip-flop 30 changes from a logic 1 level to a logic 0 level and this level is fed back and inverted by NOR gate 26 and OR gate 22 to hold a logic 1 level at conductor 32 thereby guaranteeing that flip-flop 30 stays in the set state for successive E clock cycles after time 206 pending completion of the data transfer sequence. The logic 0 to logic 1 transition of node 36 at time 206 is coupled to the input of NAND gate 38 resulting in a logic 0 at node 46 which couples to the reset direct input of flip-flop 44. Flip-flop 44 is thus no longer jammed in the reset state and is thereby free to function in the initiation of the data transfer sequence. This initiation of the data transfer sequence is shown at time 208 in FIG. 2 when the transfer input (node 64) changes from a logic 0 level to a logic 1 level indicating that the serial data transmission of a previous data word is complete. The logic 0 to logic 1 transition on node 64 is inverted by inverter 66 to produce a logic 1 to logic 0 transition on conductor 68 which couples to the $\overline{S}$ input of data transfer initiation of flip-flop 44. As described above flip-flop 44 is a negative edge triggered set-reset flip-flop so that this logic 1 to logic 0 transition sets flip-flop 44 resulting in a logic 0 to logic 1 transition on conductor 50 at time 208 as is shown in FIG. 2. The logic 1 level on conductor 50 and the logic 1 transfer pulse on conductor 64 are coupled to the inputs of AND gate 52 resulting in a logic 1 level at its output which couples to conductor 98. The logic 1 level on conductor 98 enables AND gates 86, 90 and 94 and thereby transfers the data word present in buffer register 78 in parallel to the data inputs of shift register 114 such that the data word is loaded into shift register 114 at the next logic 1 to logic 0 transition of the CTX clock (node 112) at time 210 shown in FIG. 2.

The logic 1 to logic 0 transition of the transfer pulse at time 210 denotes the end of data transfer and initiates the final sequence of logical operations by which control is transferred from the CTX clock system back to the E clock system. This transition is inverted by inverter 66 to produce a logic 0 to logic 1 transition at the input of NOR gate 54. The logic 1 on conductor 50 is inverted by inverter 48 to produce logic 0 on conductor 56 which previously coupled to another input of NOR gate 54 as an enable thus allowing the TFR input to produce a logic 1 to logic 0 transition at the output of NOR gate 54 which couples to the $\overline{S}$ input of data transfer complete flip-flop 40 via conductor 58. This logic 1 to logic 0 transition at the $\overline{S}$ input sets flip-flop 40 producing logic 1 on conductor 60 and logic 0 on conductor 62. The logic 0 on conductor 62 couples to an input of NAND gate 38 resulting in logic 1 on conductor 46 which then jams data transfer initiate flip-flop 44 to the reset state so that further data transfer operations are inhibited until a new sequence of operations is generated by the loading of a new data word into buffer register 78. The logic 1 on conductor 60 at time 210 couples to an input of NOR gate 26 producing logic 0 on conductor 28 which couples to an input of OR gate 22, thus producing logic 0 on conductor 32 which couples to the data input of buffer register flip-flop 30. This logic 0 conditions data input of flip-flop 30 such that flip-flop 30 is reset at the next logic 1 to logic 0 transition of the E clock as is shown at time 212 in FIG. 2. The resetting of flip-flop 30 produces a logic 1 to a logic 0 transition on conductor 36 at time 212. This logic 1 to logic 0 transition is coupled via conductor 36 to the reset input of flip-flop 40 such that flip-flop 40 is reset at time 212 indicating the completion of the data transfer sequence. The logic 0 present on conductor 36 subsequent to time 212 provides an indication to the first data system that buffer register 78 is once again available for loading of the next data word to be transferred such that the data transfer sequence previously discussed can be repeated. Since conductor 36 couples directly to an input of NAND gate 38, logic 0 is coupled to this input of NAND gate 38 before the logic 1 on conductor 62 resulting from the resetting of flip-flop 40 is coupled to the other input of NAND gate 38. Thus the logic 1 level which is present on conductor 46 and which jams data transfer initiate flip-flop 44 in the reset state as previously discussed is sustained and control of the data transfer sequence has once again been returned to buffer register full flip-flop 30 and data transfer circuit 10 is ready for the initiation of a new data transfer sequence which will repeat the sequence of logical operations which has been described.

Although the operation of the data transfer circuit of the present invention has been described for one possible relationship of the asynchronous clocks of a first and a second data system as illustrated by the timing diagram of FIG. 2, its operation is in no way limited to this or any other particular relationship. The fact that the data transfer circuit of the present invention makes use of three logically interlocked storage elements which respond to a particular sequence of logic transitions and which thereby function interdependently to record and control the time when data is available for transfer, the time when data transfer begins and the time when data transfer is complete makes it possible for data transfer to be accomplished without a loss of data independent of the clock pulse width and frequency relationship of the asynchronous clocks of the first and the second data system.

We claim:

1. A digital logic circuit for synchronizing the transfer to data between asynchronously clocked data systems comprising:
   a. a first register coupled to a source of data,
   b. a second register coupled to said first register,
   c. first control means for selectively enabling the loading of data from said source of data into said first register, said first control means comprising a first flip-flop, one state of which denotes that data is available for transfer from said first register to said second register,
   d. second control means for selectively enabling the transfer of data from said first register to said second register,
   e. third control means for enabling the transfer of data from said second register to an output,
   f. said third control means including further means for inhibiting said first and second control means until completion of the transfer of data from said second register.

2. The digital logic circuit recited in claim 1 wherein said second control means comprises a second flip-flop whose set state denotes that data transfer has been initiated from said first register to said second register.

3. The digital logic circuit recited in claim 2 wherein said third control means comprises a third flip-flop whose set state denotes that data transfer has been completed from said second register.

4. The digital logic circuit recited in claim 1 wherein said first flip-flop comprises a clocked data flip-flop.

5. The digital logic circuit recited in claim 2 wherein said second flip-flop comprises an edge sensitive set reset flip-flop.

6. The digital logic circuit recited in claim 3 wherein said third flip-flop comprises an edge sensitive set reset flip-flop.

7. The digital logic circuit recited in claim 3 further comprising first gating means coupled to said first flip-flop for holding said second flip-flop reset if said first flip-flop is not set.

8. The digital logic circuit recited in claim 7 further comprising a receiving system clock, and second gating means coupled to said second flip-flop for setting said third flip-flop in synchronizm with the receiving system clock when said second flip-flop is set.

9. The digital logic circuit recited in claim 8 further comprising a transmitting system clock, and means coupled to said third flip-flop for resetting said first flip-flop in synchronizm with the transmitting system clock when said third flip-flop is set.

10. The digital logic circuit recited in claim 9 further comprising means coupled to said first flip-flop for resetting said third flip-flop when said first flip-flop changes from the set state to the reset state.

* * * * *